Dec. 19, 1961   H. HÖSLI   3,013,409
DISMANTLEABLE COUPLING
Filed Oct. 21, 1960   2 Sheets-Sheet 1
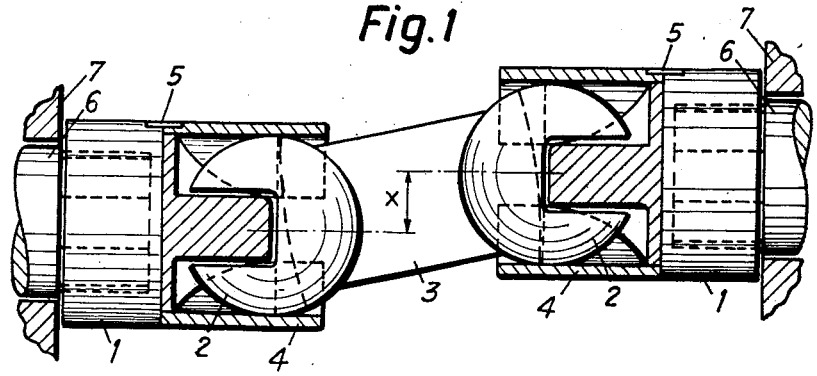
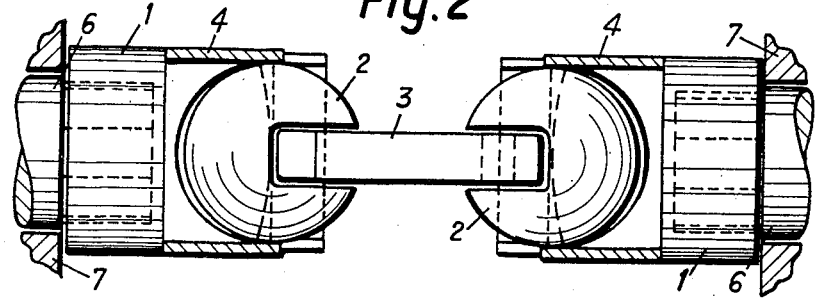
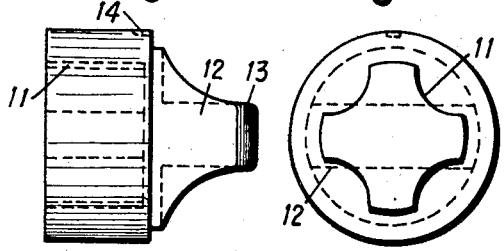
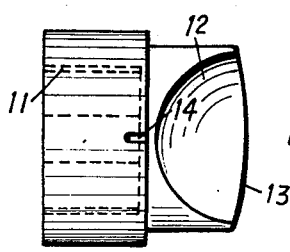
INVENTOR.
Heinz Hösli
BY Werner W. Kleeman
ATTORNEY Dec. 19, 1961 H. HÖSLI 3,013,409
DISMANTLEABLE COUPLING
Filed Oct. 21, 1960 2 Sheets-Sheet 2
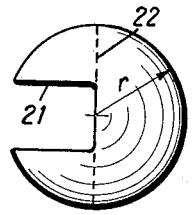
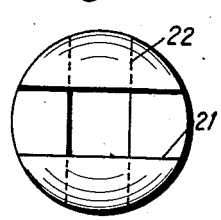
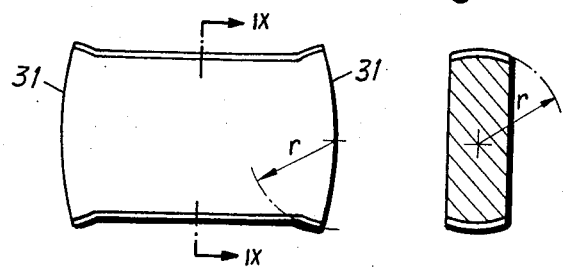
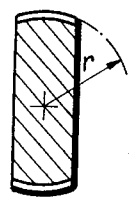
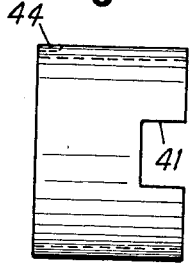
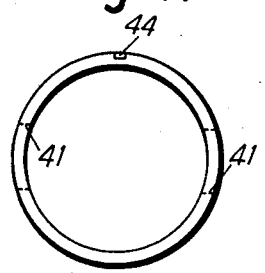
INVENTOR.
HEINZ HÖSLI
BY Werner W. Kleeman
ATTORNEY United States Patent Office 3,013,409
Patented Dec. 19, 1961

3,013,409
DISMANTLEABLE COUPLING
Heinz Hösli, Gerlafingen, Switzerland, assignor to Gesellschaft der Ludw. von Roll'schen Eisenwerke A.G., Gerlafingen, Switzerland, a corporation of Switzerland
Filed Oct. 21, 1960, Ser. No. 64,034
Claims priority, application Switzerland Oct. 23, 1959
13 Claims. (Cl. 64—8)

The present invention relates generally to a coupling member and, more specifically, to a coupling member adapted to place two rotatable members in torque transmitting relationship, the axes of rotation of which may be parallel and/or offset, intersecting or skew.

The coupling member of the present invention is especially suitable for use in conjunction with shaft members which are supported for rotation at a predetermined distance from one another, as for example, mounted in bearings, which distance may vary and alter itself within certain tolerance limits, owing perhaps to inaccuracies in the bearing construction or faulty shaft mounting, without effecting the operability and function of the coupling. the coupling member is particularly noteworthy in that none of the actual torque transmitting components are fixedly secured to one another thus facilitating assembly and disassembly of the coupling with accompanying ease of interchangeability of parts to accommodate different shaft spacings, as well as, disassembly and assembly of the coupling without necessitating removal of the shaft members from their supports. Additionally, the coupling is readily suited for torque transmission between shaft ends which are slightly out of alignment or in fact not coaxial, in either event the axes of the shafts may or may not be parallel.

Couplings of varying construction are known in the art. For the most part, however, their use is limited to particular situations and conditions of shaft mounting. Even then they have proven to be cumbersome in structure, difficult to mount and oftentimes unreliable in service. Moreover, the heretofore known couplings do not permit ease of mounting and ready interchangeability of parts to accommodate for various shaft spacings and replacement of parts.

The present invention contemplates the provision of a novelly constructed coupling member which obviates the aforementioned disadvantages while simultaneously, ensuring positive torque transmission between rotatable members. To this end, there is provided a pair of annular members, preferably spherical in shape, which have a pair of slots lying in intersecting planes. Each of the slots extend from the peripheral surface of the spherical ball member toward a central plane. One of the slot members is positioned in the direction of a shaft end and communicates therewith. Such communication can be carried out by either directly shaping the shaft end to be receivable in the slot, or else, by providing a collar member having a projecting lip which rides in the slot and is operatively connected to said shaft end. The other of the slots of the respective ball members accommodates a connecting member bridging a pair of such spaced ball members, each one of which is associated with a shaft end. The connecting member is detachably seated in the other of the slots and is able to rock and slide therein. Suitable means are operatively associated with the ball members and connecting member to ensure that the connecting member remains seated within its provided slots during torque transmission, while still permitting quick and relatively easy removal of the connecting member from said slots during disassembly of the coupling. Such means may be in the form of a cap or sleeve which may be supported by the collar member or ball member and rotatable relative thereto for removal of the connecting member. The shaft ends may further be provided with suitable surfaces for seating the caps so that the latter are held in a position in which they cover the ball members. The cap member may preferably be provided with recesses facilitating removal and insertion of the connecting member during assembly and disassembly of the coupling. Another advantageous feature of the present invention is that the parts receivable in the slots of the respective ball members are domed or curved outwards so as to permit rolling or rocking of such domed surfaces in their provided slots during the torque transmitting operation.

Accordingly, it is an important object of the present invention to provide a novel coupling structure permitting assembly and disassembly thereof in a relatively simple manner, has relatively few parts, is sturdy in structure, reliable in its operation and suitable for use in conjunction with shafts, the axes of rotation of which may be parallel and offset, skew or intersecting.

Another object of the present invention is the provision of a novel coupling structure which may be assembled or disassembled without requiring movement of the shafts either radially or axially.

A further object of the present invention is to provide a coupling which may effectively be employed in conjunction with shafts mounted so as to exhibit a certain amount of play, whereby changes in the spacing between shaft ends in the axial direction may occur without effecting the torque transmitting capabilities of the coupling.

Still a further object of the present invention is to provide a coupling structure, the individual parts of which are as simple in structure as possible but highly suitable and efficient in their torque transmitting function.

Yet a further object of the present invention is the provision of a coupling wherein the actual torque transmitting elements are not physically and fixedly secured to one another thereby facilitating assembly and disassembly of the coupling.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

FIGURE 1 illustrates a longitudinal section taken through an assembled coupling and its connection with a pair of spaced and mounted shaft ends;

FIGURE 2 illustrates a plan view of the assembled coupling and the mounted shaft ends shown in FIGURE 1;

FIGURE 3 is a side view of a collar piece or coupling sleeve pursuant to the present invention;

FIGURE 4 is an end view of the collar piece shown in FIGURE 3;

FIGURE 5 is a plan view of the collar piece shown in FIGURE 3;

FIGURE 6 is a side view of a ball member showing the details of construction thereof and forming part of the coupling unit;

FIGURE 7 is an end view of the ball member shown in FIGURE 6 pursuant to the present invention;

FIGURE 8 is a side view of a connecting member interconnecting a pair of spaced ball members defining a coupling unit according to the present invention;

FIGURE 9 is a sectional view taken along the line IX—IX of the connecting member shown in FIGURE 8;

FIGURE 10 is a side view of a cap member forming part of the coupling housing; and FIGURE 11 is an end view of the cap member shown in FIGURE 10.

Referring now to the drawings and, more particularly, to FIGURES 1 and 2 thereof, there is illustrated a pair of spaced rotatable members in the form of shafts 6 which are mounted or supported for rotation in brackets or bearings 7 in such a manner that the axes of the shafts are parallel to one another but offset with respect to each other by a certain distance $x$. The shafts 6 are provided with a pair of opposing shaft ends 6a which are arranged to face one another and designed to accommodate a respective collar piece 1 which may be slipped onto said shaft ends 6a. Each of the collar pieces 1 is provided at an end face 11a with a suitable recess 11 adapted to receive and engage a complementary neck portion formed on the shaft end 6a of the respective shaft 6, thereby providing a releaseable but positive connection between the rotating shaft 6 and the collar piece 1. Each of the collar pieces 1 is further provided on a diametrically opposed face 11b with a projecting rib or lip 12 positioned in a plane which is common to the axis of rotation of the respective associated shaft 6. The coupling unit B is formed of a pair of spaced annular members in the form of spherical balls 2. Each of the ball members 2 is provided with a pair of slots 21 and 22 extending from opposite surfaces of the ball 2 and preferably extending to a plane taken through the center of each ball member 2. As shown in detail in FIGURES 6 and 7, the surface contour of the slots 21 and 22 are so designed as to provide flat surface portions 21a and 22a lying in planes which intersect one another, and preferably perpendicularly disposed with respect to each other, thereby balancing the forces and strain exerted on the thrust-stressed cross-sections in the interior of the ball members 2. In order to minimize the effect of the notching or slots provided in the interior of the ball members 2 it has been found expedient to round off or bevel the edges 21b appearing at the interior of the ball members 2. Both of the slots 21 and 22 are made substantially equal in width to the width of the projecting lips or ribs 12. The coupling unit B provided for the transmission of torque between the rotatable members 6 is further constituted by an intermediate connecting member in the form of a plate 3 receivable in the opposed slots 22 of the ball members 2 for sliding and rockable movement therein. Similarly, the thickness of the connecting plate 3 also substantially corresponds to the width of the slot 22 receiving one end of said connecting member.

Thus, with the coupling unit in its assembled position, each of the projecting ribs 12 engages a slot 21 provided in the ball member 2, whereas the connecting plate 3 engages at its ends 31 the remaining slots 22 of the spaced ball members 2, thus defining and providing a positive connection for transmitting rotation and torque between the two spaced and supported shafts 6. The outer faces 13 of the projecting ribs or lips 12 and the outer end faces 21 of the connecting plate 3 are arched or curved in an outward direction so that during rotation of the coupling in its assembled condition these curved surfaces are able to rock and slide on the flat surface portion of the respective slots 21 and 22 provided on the ball members 2. Furthermore, the lateral end portions 31a of the end faces 31 of the connecting plates 3 are preferably imparted with a curved portion defining a portion of a sphere having a radius $r$ corresponding to the radius $r$ of the respective ball members 2, whereby these curved portions 31a when the plate 3 is in its torque transmitting position form a common surface with the ball members 2.

Additionally, there is provided a pair of cap members 4 which together with the collar members 1 form a coupling housing A, which cap members do not transmit any torque but merely serve to maintain the projecting lips or ribs 12 and the connecting plate 3 in their engaged position with the ball members 2. The caps 4 are each disposed circumjacent one of the ball members 2 and are detachably and rotatably connected as by being slipped onto a respective collar piece 1 at one end 4a. The cap members have a width sufficient to ensure that they always cover the outer curved portions 31a of the connecting plate 3 when the latter is riding in its provided slot 22, even when the angular movement during rotation with respect to the axes of the shafts is at its greatest, as clearly shown in FIGURE 1. The respective cap members 4 are releasably and positively connected to a respective collar piece 1 for rotation therewith by means of, and by way of example, a key 5 insertable in the keyways 14 and 44 provided in the collar member 1 and cap member 4, respectively.

Each of the cap members 4 is provided on its end 4b remote from the shaft end 6a with a pair of diametrically opposed recesses 41. When the key 5 is inserted in respective keyways 14 and 44 which are in aligned position, said recesses 41 are offset with respect to the connecting plate 3 in a position of rotation preferably by an angle approximating 90°. When, however, it is desired to disassemble the torque transmitting relationship of the coupling assembly the positive connection for rotation between the cap 4 and the collar piece 1 may be disconnected by removing the key 5 so that it is now possible to rotate the respective cap member relative to its associated collar member 1 into a position wherein the recesses 41 lie in a common plane with the connecting plate 3 and the slots 22. The dimensions of the recesses 41 are suitably chosen such that they, when disposed in the last mentioned position, define a channel which is a continuation of the slots 22. The exact contour and shape of the recesses 41 is, of course, of no particular importance. The only essential requirement is that the recesses 41 are of such suitable dimension and shape that the connecting plate 3 can be removed and slid out of its engaging position with the ball members 2 via the aforementioned defined channel. Consequently, the positive torque and rotation transmitting connection between the shafts 6 is uncoupled, so that the remaining elements of the coupling can also be easily removed. Reassembly of the coupling unit may be performed in the reverse order, namely: the ball members 2 are slipped over the projecting lips or ribs 12 and the caps 4 are each disposed circumjacent one of the ball members 2 with the recesses 41 positioned in a plane common to the slots 22 so as to be capable of receiving the connecting plate 3. Thereafter, the connecting plate 3 is inserted through the recesses 41 into the slots 22 provided on the ball members 2 and, finally, the caps 4 are rotated into a position so that the keyways 14 and 44 are aligned, whereafter the key 5 is inserted into said keyways so that the respective collar pieces 1 and the respective associated cap members 4 are detachably secured for rotation to one another. It is, of course, possible to provide each cap member with a single recess 41 or in fact with a plurality of such recesses, in which case the only condition which must be fulfilled is that the cap member 4 must be detachably secured for rotation with the collar member 1 in such a position that none of the recesses 41 is arranged opposite the slot 22 in order to prevent removal of the connecting plate 3 from its associated ball members 2 during the desired coupling and torque transmitting connection. Moreover, any suitable means to maintain the connecting member in its provided slot may be employed.

As, of course, is readily to be understood various departures from the illustrated and described embodiment are possible. For example, the reason why the caps in the described embodiment have been shown provided with the recesses 41 is in view of the fact that the connecting plate 3 is relatively short in view of the close spacing of the shaft ends 6a. Thus, if this connecting plate 3 were of greater lengthwise dimension, that is to say, if the distance between the respective shaft ends 6a were larger, it would be possible to entirely dispense with these recesses 41 and with the locking of the position of rotation of the cap members 4. Thus, during disassembly of the coupling, the respective cap members could be successively slipped over and down the length of the connecting plate 3 to such an extent that the connecting plate would now be able to be removed from the freely exposed slots 22. Also, it would not be absolutely necessary to slip on and center the cap members 4 with respect to the collar pieces 1. Instead, it would be sufficient to lock the cap members 4 in the axial direction with respect to the ball members 2. Moreover, it is not absolutely necessary that the cap members 4 rest against the face 11b of the respective collar pieces 1. Rather, they may be narrower, the minimum width being determined by the requirement that they must still cover and overlie the corners of the projecting lips 12 of the collars 1 and the end portions 31 of the connecting plate 3 during the time when rotational movement of the parts is at their greatest. Finally, instead of employing specially designed collar pieces 1 having the projecting lip portions 12, it is also possible to form the projecting lips or ribs 12 integral with the end faces 6a of the respective shafts 6. Moreover, the intermediate connecting member 3 need not necessarily have the shape of a plate, it being sufficient if the ends thereof are provided with suitable portions adapted to engage the slots 22 of the ball mmebers 2 whereas the intermediate portion thereof can be given any other desirable cross-section suitable for transmission of torque between the respective shafts 6. This is especially true in those cases where the distance to be bridged by the intermediate connecting member 3 is relatively large. It is also readily to be appreciated that under certain circumstances it is possible to directly connect one end of the connecting member 3 to one of the shafts 6 with the other end riding in a ball member 2 and a coupling housing A as described hereinabove. The coupling described herein is readily suitable for the connecting together in torque transmitting relationship of shaft members or other rotatable members, the respective axis of rotation of which may be either parallel, intersecting or skew.

As will also be readily apparent the coupling design pursuant to the teachings of the present invention consists of relatively few parts, each of which are easy to manufacture. All of the surfaces employed for the transmission of the torque and sliding in contact with one another are flat and therefore easy to machine. Thus, they may be designed in the form of simple wearing plates which are readily replaceable. Moreover, the inividual elements are extremely robust in construction so that the coupling is readily suitable for heavy duty work and for the transmission of relatively large torques, as for example, those experienced generally in rolling mills. Deviations within certain limits from the said distance between the ends of the shaft which may possibly arise during the manufacture or installation of the shafts or any subsequent changes in their positioning do not in any way impair the working of the coupling. The coupling is also extremely easy to lubricate and besides all these advantages the outside diameter of the coupling is very small in comparison with the diameter of the shafts.

Having thus described the invention what is desired to be secured by United States Letters Patent, is:

1. In a coupling, a pair of spaced ball members, each of said ball members being provided with a first slot adapted to provide communication with a respective end of a rotatable member, each of said ball members being provided with a second slot lying in a plane intersecting said first slot and adapted to receive a connecting member for interconnecting said pair of spaced ball members in torque transmitting relationship, said first and second slot of each ball member extending from diametrically opposed locations on the peripheral surface thereof toward the geometric center of said ball member, and a connecting member slidably and rockably receivable in said second slot of each of said ball members interconnecting said pair of spaced ball members for torque transmitting relationship.

2. In a coupling according to claim 1, wherein said ball members are spherical in shape.

3. In a coupling according to claim 2, wherein said connecting member is provided with curved end portions receivable in said second slot of said ball members facilitating rocking movement therein.

4. In a coupling according to claim 3, wherein said connecting member is a plate.

5. In a coupling, a pair of spaced ball members, each of said ball members being provided with a first slot adapted to provide communication with a respective end of a rotatable member, each of said ball members being provided with a second slot lying in a plane intersecting said first slot and adapted to receive a connecting member for interconnecting said pair of spaced ball members in torque transmitting relationship, a connecting member having end portions slidably and rockably receivable in said second slot of each of said ball members interconnecting said pair of spaced ball members for torque transmitting relationship, and means cooperable with said end portions of said connecting member to releasably maintain said end portions in said second slot of each of said ball members during operation of said coupling.

6. In a coupling according to claim 5, said cooperable means being a separate cap member having at least one recess permitting insertion and removal of said connecting member into and out of said second slot of each of said ball members, said separate cap members being rotatably mounted relative to said ball members to permit non-alignment of said recess with said second slot to retain said end portions of said connecting member seated in said second slot of each of said ball members.

7. In a coupling for transmitting torque between two rotatable members; a pair of spaced collar members each adapted to engage a respective end of a rotatable member for rotation therewith, a separate ball member provided with a pair of slot means disposed in intersecting planes slidably associated with each of said collar members, one of said slot means of each separate ball member being inwardly directed toward its associated collar member, each of said collar members being provided with projecting means slidably receivable in said inwardly directed slot means permitting relative sliding movement between said ball member and its associated collar member, connecting means having end portions slidably arranged in the other of said slot means of said separate ball members to bridge the latter and place said rotatable members in torque transmitting relationship, and means cooperable with said end portions of said connecting member to retain the latter seated in said other slot means during operation of said coupling.

8. In a coupling for transmitting torque between two rotatable members; a pair of spaced collar members each adapted to engage a respective end of a rotatable member for rotation therewith, a separate ball member provided with a pair of slot means disposed in intersecting planes slidably associated with each of said collar members, said pair of slot means of each ball member extending from diametrically opposed locations on the peripheral surface of said ball member toward the geometric center of said ball member, one of said slot means of each separate ball member being inwardly directed toward its associated collar member, each of said collar members being provided with projecting means slidably receivable in said inwardly directed slot means permitting relative sliding movement between said ball member and its associated collar member, connecting means having end portions slidably arranged in the other of said slot means of said separate ball members to bridge the latter and place said rotatable members in torque transmitting relationship, and means cooperable with said end portions of said connecting member to retain the latter seated in said other slot means during operation of said coupling.

9. In a coupling for transmitting torque between two rotatable members according to claim 8, said cooperable means being a separate cap member each mounted for rotation relative to a collar member and supported thereby, each of said cap members being provided with at least one recess movable into alignment with the other of said slot means to permit removal of said connecting means therefrom, and means for fixing said cap member in non-aligned position with respect to the other of said slot means to prevent removal therefrom of said connecting means.

10. In a coupling for transmitting torque between two rotatable members, according to claim 8, wherein said spaced collar members and their projecting means are integral with and define a respective end of a rotatable member.

11. In a coupling, an annular member having a first slot and a second slot lying in a plane intersecting said first slot, said first slot being adapted to provide communication with a first rotatable member, said second slot being adapted to receive a slidable and rockable connecting member transmitting torque from a second rotatable member to said first rotatable member.

12. In a coupling according to claim 11, wherein said annular member is a spherical ball.

13. In a coupling according to claim 12, wherein said first and second slot of said spherical ball extends from diametrically opposed locations on the peripheral surface thereof toward the geometric center of said spherical ball.

References Cited in the file of this patent

UNITED STATES PATENTS

| | | |
|---|---|---|
| 1,139,125 | Kennedy | May 11, 1915 |
| 1,907,833 | Kurtze | May 9, 1933 |
| 1,908,307 | Biggert | May 9, 1933 |
| 2,577,508 | Biggert | Dec. 4, 1951 |

FOREIGN PATENTS

| | | |
|---|---|---|
| 937,648 | France | Mar. 15, 1948 |